(12) United States Patent
Asai

(10) Patent No.: US 9,374,357 B2
(45) Date of Patent: Jun. 21, 2016

(54) INFORMATION PROCESSING DEVICE, AND METHOD AND COMPUTER-READABLE MEDIUM THEREFOR FOR THE INPUT AND STORAGE OF AUTHENTICATION INFORMATION

(71) Applicant: BROTHER KOGYO KABUSHIKI KAISHA, Nagoya, Aichi (JP)

(72) Inventor: Norihiko Asai, Tajimi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/552,972

(22) Filed: Nov. 25, 2014

(65) Prior Publication Data
US 2015/0150108 A1 May 28, 2015

(30) Foreign Application Priority Data

Nov. 28, 2013 (JP) .................................. 2013-245999

(51) Int. Cl.
*G06K 15/00* (2006.01)
*H04L 29/06* (2006.01)
*G06F 3/12* (2006.01)

(52) U.S. Cl.
CPC ............... *H04L 63/08* (2013.01); *H04L 63/083* (2013.01)

(58) Field of Classification Search
CPC ... G06F 3/1222; G06F 3/1238; G06F 3/1279; G06K 15/4095; H04L 63/08; H04L 63/083; H04L 63/0823
USPC ......... 358/1.1, 1.9, 1.14, 1.15, 1.16; 713/300, 713/310, 320, 324; 709/201, 203; 726/16, 726/27
See application file for complete search history.

(56) References Cited

U.S. PATENT DOCUMENTS

| | | | | | |
|---|---|---|---|---|---|
| 7,835,019 | B2 * | 11/2010 | Sugishita | ............. | H04N 1/0035 358/1.1 |
| 8,817,291 | B2 * | 8/2014 | Yamamoto | ............ | G06F 21/608 358/1.13 |
| 2006/0256370 | A1 * | 11/2006 | Murakawa | .............. | G06F 21/31 358/1.15 |
| 2008/0134295 | A1 * | 6/2008 | Bailey | ..................... | G06F 21/41 726/4 |
| 2012/0250066 | A1 * | 10/2012 | Kikumoto | ............. | G06F 3/1222 358/1.14 |
| 2014/0063534 | A1 * | 3/2014 | Kawai | ................... | G06F 3/1222 358/1.14 |
| 2014/0320883 | A1 * | 10/2014 | Ichida | .................... | G07F 17/26 358/1.14 |
| 2015/0036167 | A1 * | 2/2015 | Naitoh | ................... | G06F 3/121 358/1.14 |

FOREIGN PATENT DOCUMENTS

| | | |
|---|---|---|
| JP | 2001-109537 A | 4/2001 |
| JP | 2004-145499 A | 5/2004 |
| JP | 2004-295252 A | 10/2004 |

\* cited by examiner

*Primary Examiner* — Gabriel Garcia
(74) *Attorney, Agent, or Firm* — Scully, Scott, Murphy & Presser, PC

(57) ABSTRACT

An information processing device including a controller configured to accept a selection of a service from among a plurality of services including a first service and a second service, control a display unit to display an authentication screen, when accepting a selection of the first service, control a communication unit to transmit authentication information input on the authentication screen displayed in response to acceptance of the selection of the first service, to a first external device configured to perform authentication for the first service, store into a storage the authentication information transmitted to the first external device, and when accepting a selection of the second service and determining that the authentication information is stored in the storage, control the communication unit to transmit the authentication information stored in the storage, to a second external device configured to perform authentication for the second service.

16 Claims, 12 Drawing Sheets

Figure 1A:
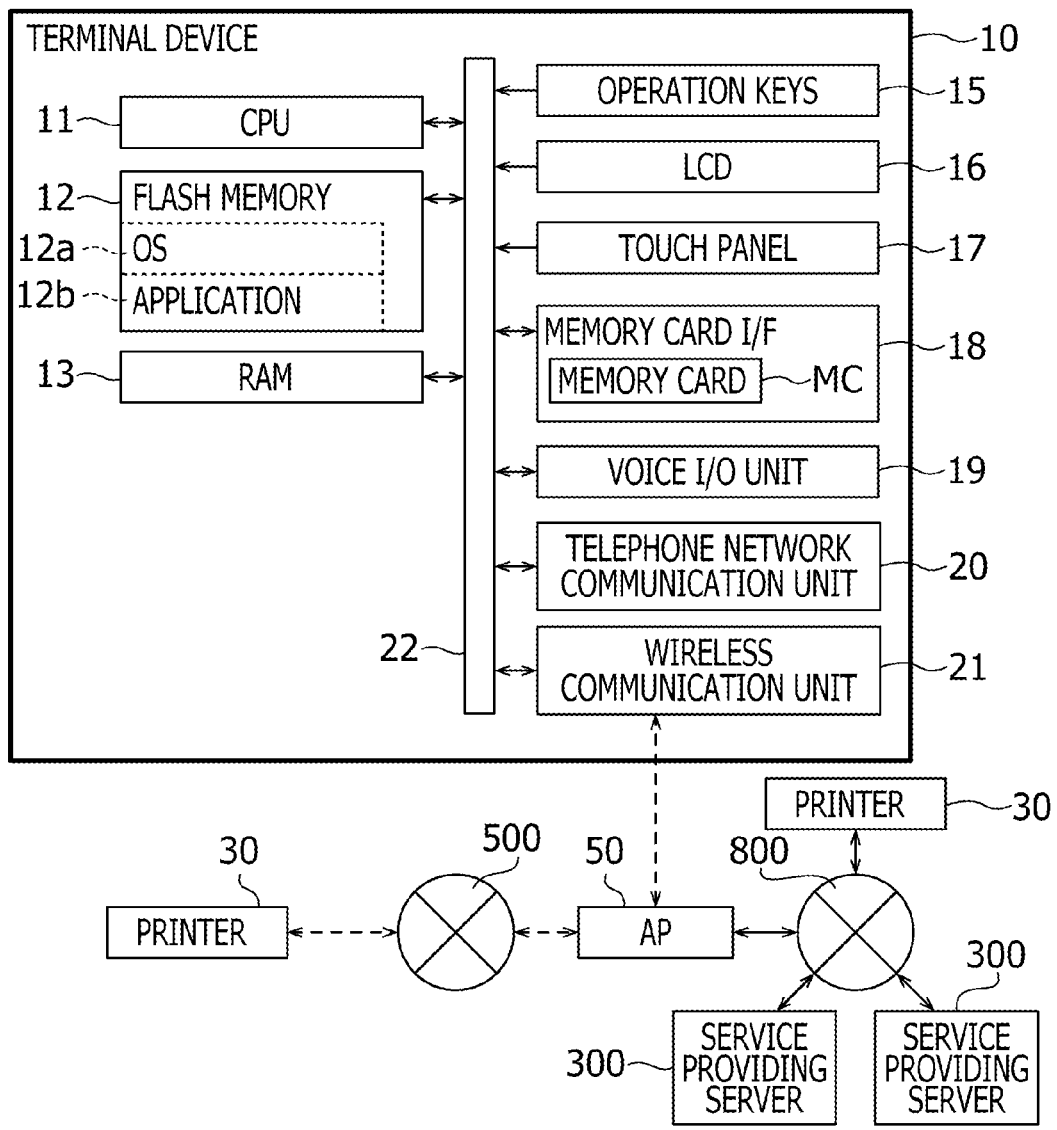

INFORMATION PROCESSING DEVICE, AND METHOD AND COMPUTER-READABLE MEDIUM THEREFOR FOR THE INPUT AND STORAGE OF AUTHENTICATION INFORMATION

CROSS-REFERENCE TO RELATED APPLICATION

This application claims priority under 35 U.S.C. §119 from Japanese Patent Application No. 2013-245999 filed on Nov. 28, 2013. The entire subject matter of the application is incorporated herein by reference.

BACKGROUND

1. Technical Field

The following description relates to one or more aspects of an information processing device, and a method and a computer-readable medium therefor.

2. Related Art

A technique has been known that is adapted to, when an icon corresponding to a specific service is operated, a user ID and a password previously stored in association with the icon are input into respective areas for accepting entries of the user ID and the password.

SUMMARY

According to the technique, it is required to previously store a user ID and a password in association with each service. Therefore, even when a single combination of a user ID and a password is applied in common to a plurality of services, the user ID and the password need to be previously stored in association with each individual one of the plurality of services.

Aspects of the present disclosure are advantageous to provide one or more improved techniques, for an information processing device, which make it possible to easily input authentication information for each of services that need authentication using the authentication information.

According to aspects of the present disclosure, an information processing device is provided, which includes a communication unit, a display unit, and a controller configured to accept a selection of a service from among a plurality of services including a first service and a second service, the second service being different from the first service, control the display unit to display an authentication screen for inputting authentication information thereon, when accepting a selection of the first service, control the communication unit to transmit authentication information input on the authentication screen displayed in response to acceptance of the selection of the first service, to a first external device configured to perform authentication for the first service, store the authentication information transmitted to the first external device, into a storage coupled with the controller, and when accepting a selection of the second service and determining that the authentication information is stored in the storage, control the communication unit to transmit the authentication information stored in the storage to a second external device configured to perform authentication for the second service, without displaying the authentication screen.

According to aspects of the present disclosure, further provided is a method adapted to be implemented on a processor coupled with a communication unit, a display unit, and a storage, the method including accepting a selection of a service from among a plurality of services including a first service and a second service, the second service being different from the first service, displaying, on the display unit, an authentication screen for inputting authentication information thereon, when accepting a selection of the first service, transmitting, via the communication unit, authentication information input on the authentication screen displayed in response to acceptance of the selection of the first service, to a first external device configured to perform authentication for the first service, storing, into the storage, the authentication information transmitted to the first external device, and when accepting a selection of the second service and determining that the authentication information is stored in the storage, transmitting, via the communication unit, the authentication information stored in the storage to a second external device configured to perform authentication for the second service, without displaying the authentication screen.

According to aspects of the present disclosure, further provided is a non-transitory computer-readable medium storing computer-readable instructions that are executable by a processor coupled with a communication unit, a display unit, and a storage, the instructions being configured to, when executed by the processor, cause the processor to accept a selection of a service from among a plurality of services including a first service and a second service, the second service being different from the first service, control the display unit to display an authentication screen for inputting authentication information thereon, when accepting a selection of the first service, control the communication unit to transmit authentication information input on the authentication screen displayed in response to acceptance of the selection of the first service, to a first external device configured to perform authentication for the first service, store, into the storage, the authentication information transmitted to the first external device, and when accepting a selection of the second service and determining that the authentication information is stored in the storage, control the communication unit to transmit the authentication information stored in the storage to a second external device configured to perform authentication for the second service, without displaying the authentication screen.

BRIEF DESCRIPTION OF THE ACCOMPANYING DRAWINGS

FIG. 1A is a block diagram showing an electrical configuration of a terminal device in a first illustrative embodiment according to one or more aspects of the present disclosure.

Figure 1B:
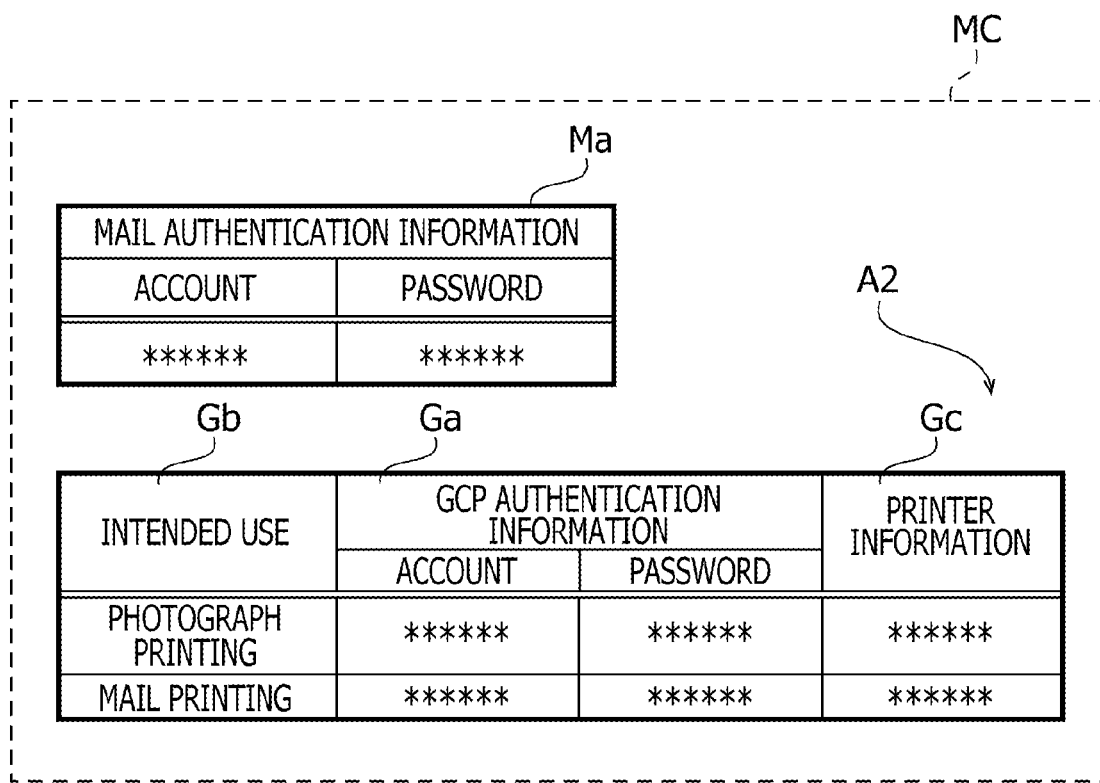

FIG. 1B exemplifies information stored in a mail authentication information storage area and information stored in a GCP authentication information storage area in the first illustrative embodiment according to one or more aspects of the present disclosure.

FIGS. 2A, 2B, 2C, 3A, 3B, and 3C are flowcharts showing a procedure of a print process in the first illustrative embodiment according to one or more aspects of the present disclosure.

FIGS. 4A, 4B, 4C, and 4D are flowcharts showing a partial procedure of a print process in a second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings. First, referring to FIGS. 1A to 3C, a first illustrative embodiment will be described. FIG. 1A is a block diagram showing an electrical configuration of a terminal device 10 having an application 12b installed thereon.

The terminal device 10 with the application 12b installed thereon is configured to utilize various services (such as a print service and a mail service) provided by service providing servers 300. Especially, the terminal device 10 with the application 12b installed thereon is configured to easily input authentication information to use each individual one of services that requires authentication using the input authentication information. In the first illustrative embodiment, the authentication information includes a combination of an account and a password.

The "print service" is such a service that a service providing server 300 provides a printer 30 on an Internet 800 with a print job generated based on a file received from the terminal device 10 and causes the printer 30 to print an image based on the file received from the terminal device 10. As an example of the print service, cited is Google Cloud Print™ (a trademark of Google Inc.) provided by Google Inc. By utilizing the print service, the terminal device 10 is allowed to cause the remote printer 30 on the Internet 800 to print the image based on the file to be printed.

The "mail service" is such a service that a service providing servers 300 provides a mail address and a function of transmitting and receiving emails using the mail address. As an example of the mail service, cited is Gmail™ (a trademark of Google Inc.) provided by Google Inc.

The terminal device 10 of the first illustrative embodiment may be a mobile terminal device such as a smartphone. The terminal device 10 includes a central processing unit 11 (hereinafter referred to as a CPU 11), a flash memory 12, a random access memory 13 (hereinafter referred to as a RAM 13), operation keys 15, a liquid crystal display 16 (hereinafter referred to as an LCD 16), a touch panel 17, a memory card interface 18 (hereinafter, which may be referred to as a memory card I/F 18), a voice input/output unit 19, a telephone network communication unit 20, and a wireless communication unit 21. The above elements included in the terminal device 10 are interconnected via a bus line 22.

The CPU 11 is configured to take control of the elements interconnected via the bus line 22, in accordance with parameters (such as fixed values) and programs stored, e.g., in the flash memory 12. The flash memory 12 is a rewritable non-volatile memory. The flash memory 12 stores an operating system 12a and the application 12b. It is noted that hereinafter, an operating system may be referred to as an OS. Further, in the following descriptions, the CPU 11 that is executing a program such as the application 12b or the OS 12a may simply be referred to with a name of the program. For example, "the CPU 11 that is executing the application 12b" may be referred to as "the application 12b." In other words, there may be a case where "the application 12b" represents "the CPU 11 that is executing the application 12b." The OS 12a is basic software configured to achieve standard functions of the terminal device 10. In the first illustrative embodiment, the OS 12a may be an Android OS (Android™ is a trademark or a registered trademark of Google Inc.).

The application 12b is supplied by venders of various devices. The application 12b is installed onto the terminal device 10 by a user. The application 12b allows the user to utilize print functions of the printers 30 from the terminal device 10. More specifically, the application 12b allows the user to utilize, from the terminal device 10, the print function of the printer 30 on the wireless LAN network 500, and the print function of the printer 30 on the Internet using the print service provided by the service providing sever 300. It is noted that the application 12b allows the user to utilize the print service and the mail service of the various services provided by the service providing servers 300. Each operation in below-mentioned flowcharts shown in FIGS. 2A to 3C is performed by the CPU 11 executing the application 12b.

The RAM 13 is a rewritable volatile memory having a temporary area for temporarily storing various types of data when the CPU 11 executes a program such as the application 12b. The operation keys 15 are mechanical keys for inputting an instruction into the terminal device 10. For instance, the operation keys 15 may be provided at a housing of the terminal device 10. The LCD 16 is configured to display various screen images. The touch panel 17 is placed on top of the LCD 16. The touch panel 17 is configured to input an instruction into the terminal device 10 when an indication body (such as a finger or a stick) is brought into contact with or close to the touch panel 17. The voice input/output unit 19 is a device for inputting and outputting voices and includes a microphone and a speaker. The telephone network communication unit 20 is a circuit configured to enable voice communication via a cellular phone network (not shown).

The memory card I/F 18 is configured such that a rewritable non-volatile memory card MC is inserted thereinto. Further, the memory card I/F 18 is configured to take control of reading data and files from the memory card MC and writing data and files into the memory card MC. The application 12b of the first illustrative embodiment is configured to provide a storage area for application within the memory card MC. The storage area includes authentication information storage areas for storing authentication information for each individual service. Specifically, in the first illustrative embodiment, the storage area for application includes a mail authentication information storage area A1 and a GCP authentication information storage area A2 as will be described later with reference to FIG. 1B.

The wireless communication unit 21 is an interface configured to perform wireless communication via a wireless LAN. In the first illustrative embodiment, the wireless communication unit 21 is configured to perform wireless communication via a wireless LAN complying with IEEE 802.11b/g. In the first illustrative embodiment, the wireless communication unit 21 is configured to connect with the wireless LAN network 500 via an access point 50 (hereinafter which may be referred to as an AP 50) as a relay device. Thereby, the terminal device 10 is allowed to perform Wi-Fi wireless communication based on Wi-Fi standards (Wi-Fi® is a trademark registered by Wi-Fi Alliance) with various devices such as the printer 30 on the wireless LAN network 500 via the access point 50.

In addition, the AP 50 has a broadband router function, and is configured to connect with the Internet 800. Thus, the terminal device 10 is allowed to connect with the service providing servers 300 on the Internet 800. The service providing servers 300 are configured to, when accessed by the terminal device 10, provide the terminal device 10 with various services.

Each of the printers 30 has a print function, and is configured to print an image based on an image file received from the terminal device 10. The printers 30, which are available to (the terminal device 10 executing) the application 12b, include the printer 30 configured to receive an image file via the wireless LAN network 500, and the printer 30 configured to receive an image file via the Internet 800, i.e., to receive an image file by utilizing the print service provided by the service providing server 300. Hereinafter, the printer 30 on the wireless LAN network 500 may be referred to as the "Wi-Fi printer 30." Further, the printer 30 on the Internet 800 may be referred to as the "GCP printer 30." It is noted that the GCP printer 30 is previously registered on each service providing server 30, as a print destination for the print service, in association with authentication information (such as an account and a password).

FIG. 1B exemplifies what are stored in the mail authentication information storage area A1 and the GCP authentication information storage area A2 provided within the memory card MC. The mail authentication information storage area A1 is a storage area for storing mail authentication information Ma to be used for authentication for the mail service. Meanwhile, the GCP authentication information storage area A2 is a storage area for storing GCP authentication information Ga to be used for authentication for the print service. Each of the mail authentication information Ma and the GCP authentication information Ga includes a combination of an account and a password.

The GCP authentication information storage area A2 is configured to store GCP authentication information Ga in association with each of intended uses Gb. The intended uses Gb are intended uses of printing by the GCP printer 30. The intended uses Gb may include photograph printing, mail printing to print a mail acquired using the mail service, document printing to print documents such as documents of a PDF file and a Microsoft Office file ("Microsoft Office" is a trademark registered by Microsoft Corporation), and Web page printing to print Web pages. It is noted that the application 12 is adapted to utilize the photograph printing and the mail printing.

Further, the GCP authentication information storage area A2 is configured to associate the GCP authentication information Ga for each intended use Gb with printer information Gc for identifying the GCP printer 30. In the first illustrative embodiment, the printer information Gc includes an IP address and a model name of the GCP printer 30. It is noted that the GCP authentication information Ga is not necessarily required to be associated with printer information Gc. Namely, even when GCP authentication information Ga is associated with an intended use Gb, the GCP authentication information Ga may not have any printer information Gc associated therewith.

In the first illustrative embodiment, as will be described later, the application 12b is configured to, in the case of successful authentication for a first service, store authentication information used for the successful authentication into an authentication information storage area corresponding to the first service, and use the stored authentication information for next authentication for the first service. Meanwhile, the application 12b is configured to, in the case of successful authentication for the first service, store authentication information used for the successful authentication into an authentication information storage area corresponding to the second service, and use the stored authentication information for next authentication for the second service. Namely, the application 12b is configured to, in the case of successful authentication for the first service, employ authentication information used for the successful authentication, to authentication for the second service as well.

Figure 2A:
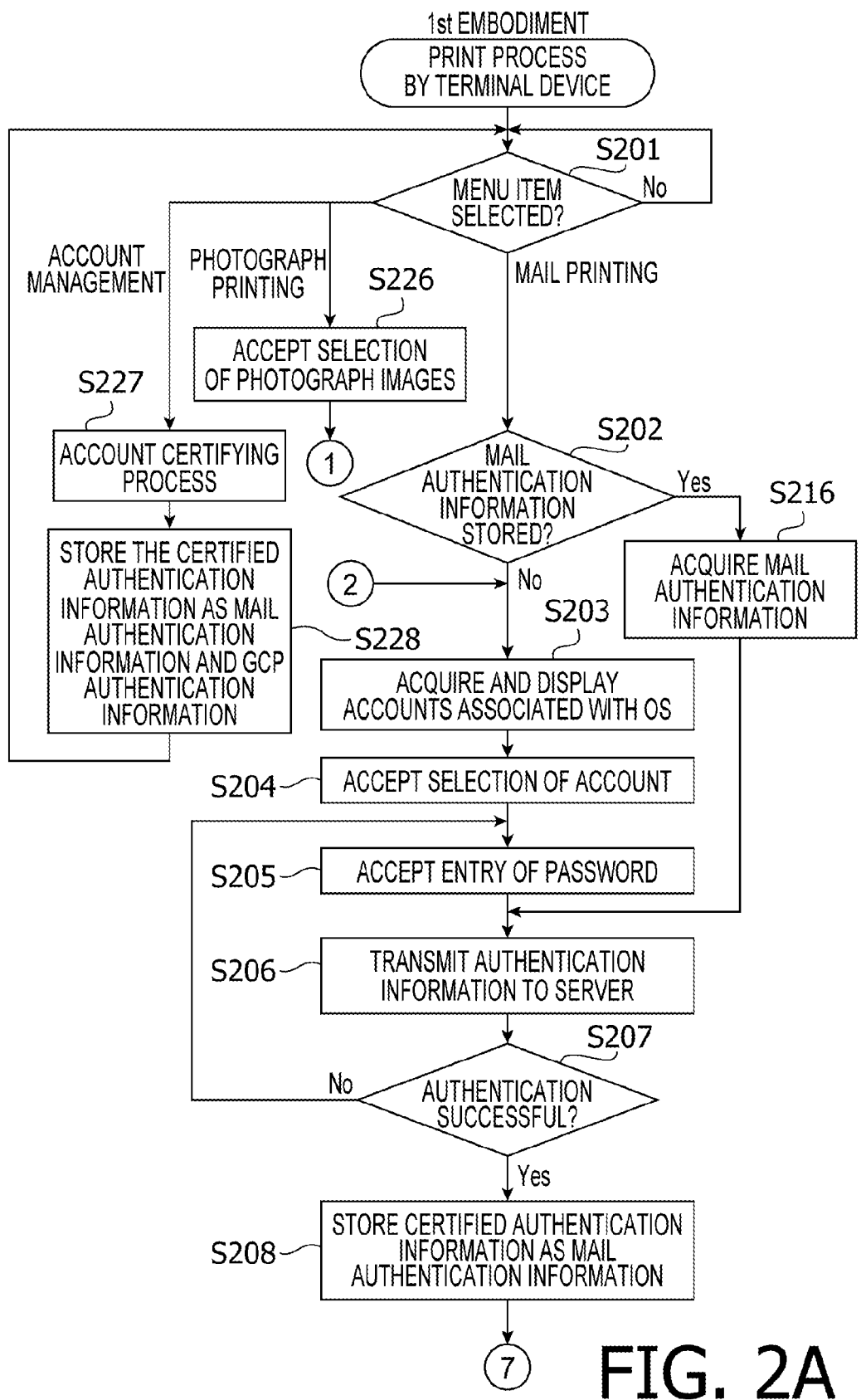
Figure 2B:
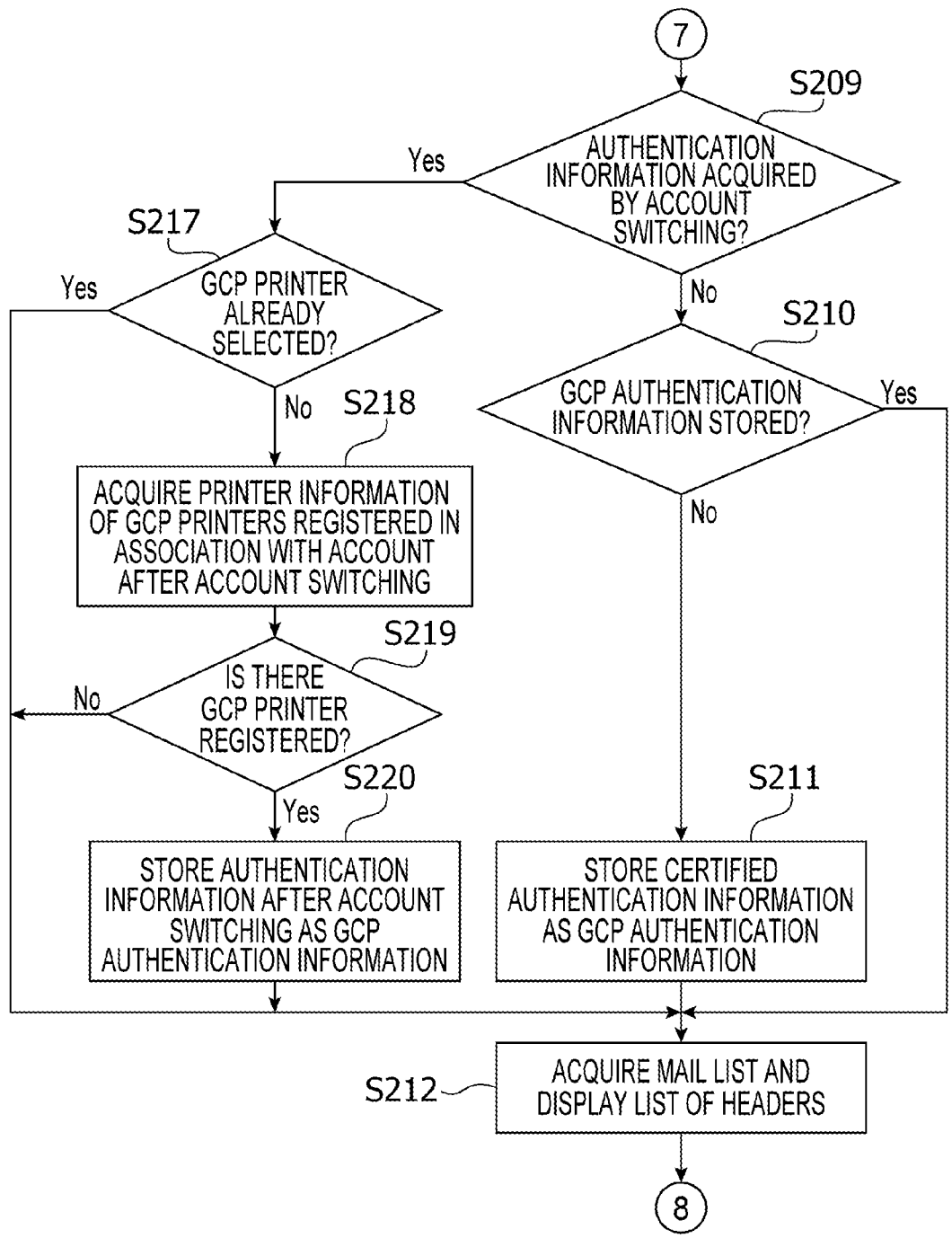
Figure 2C:
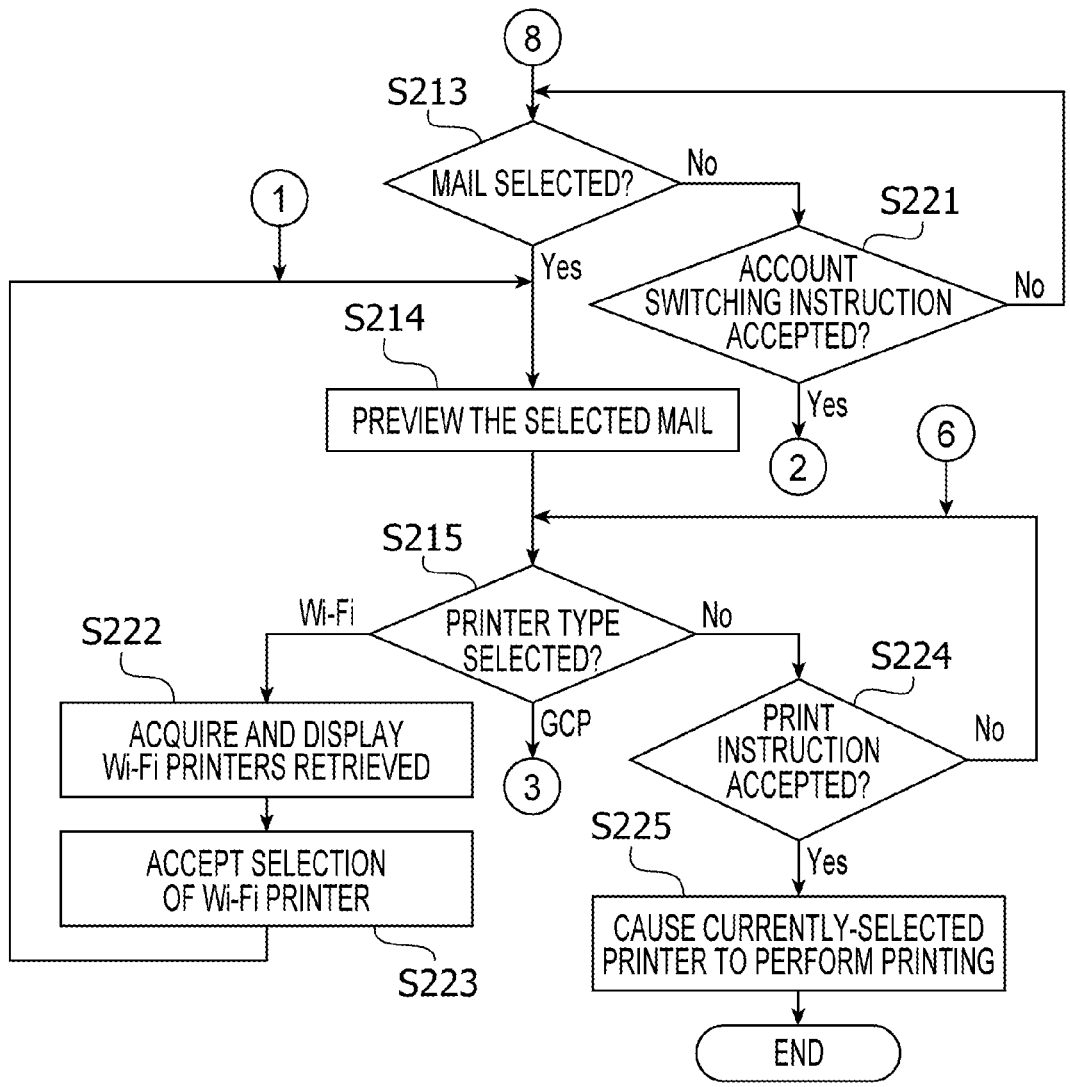
Figure 3A:
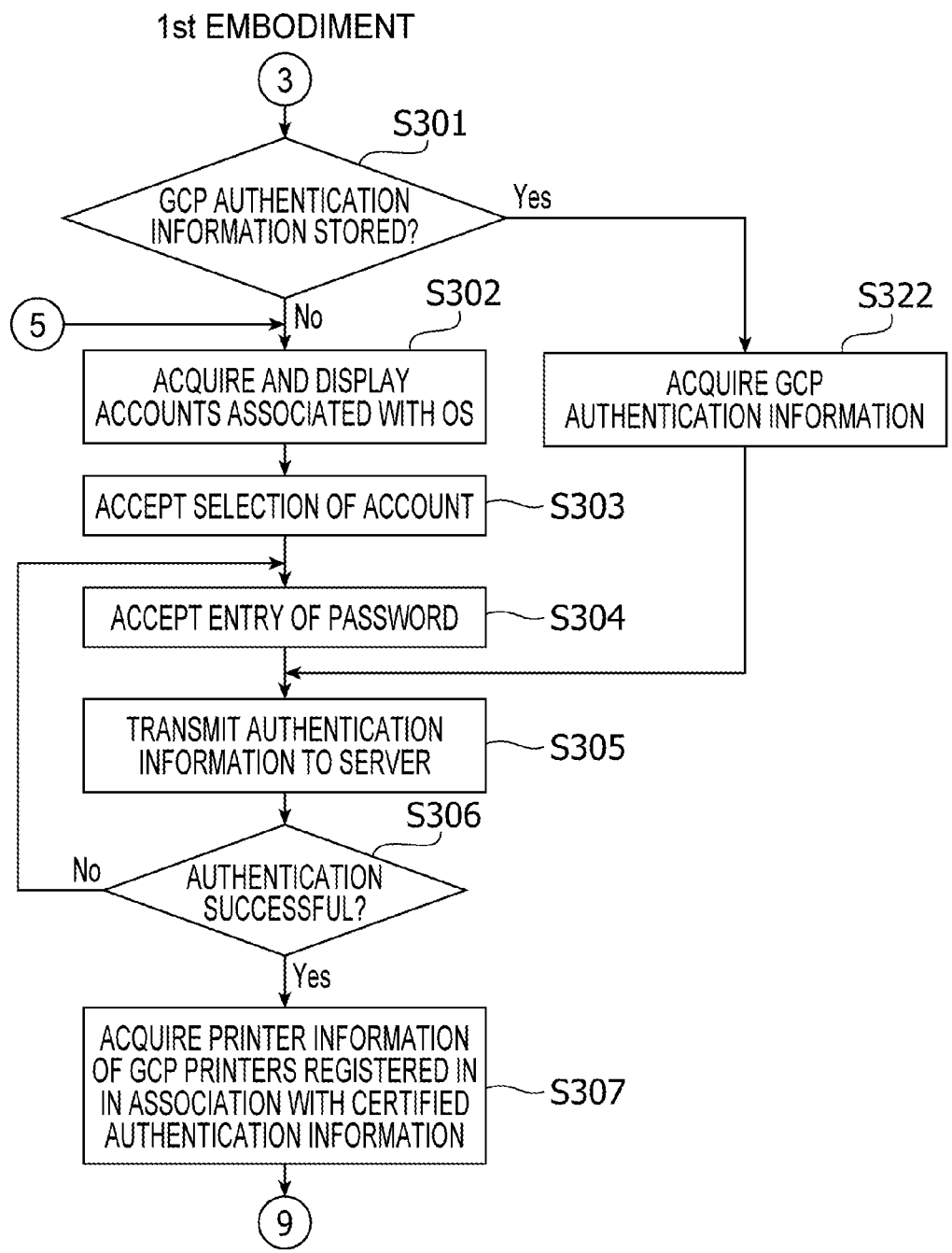
Figure 3B:
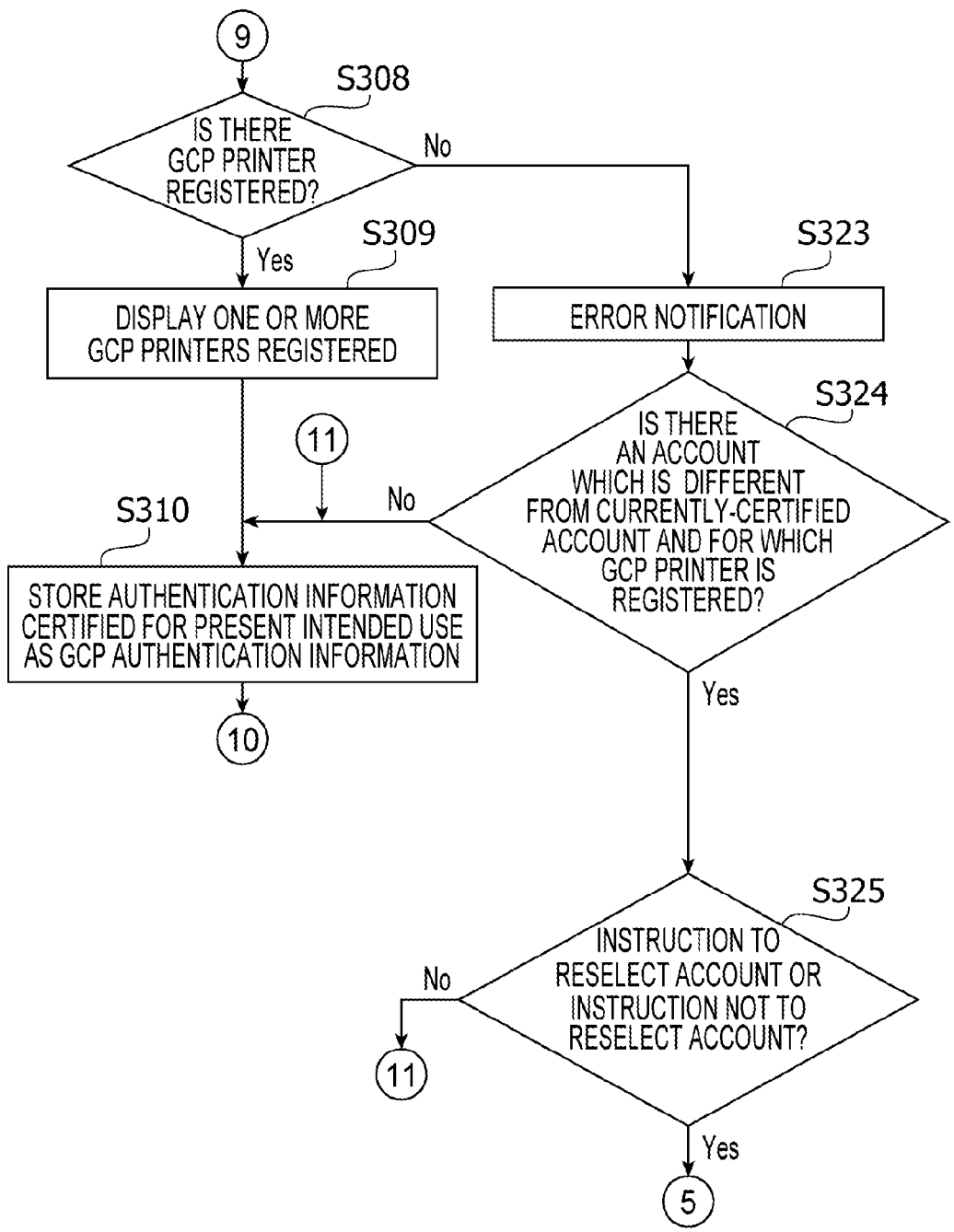
Figure 3C:
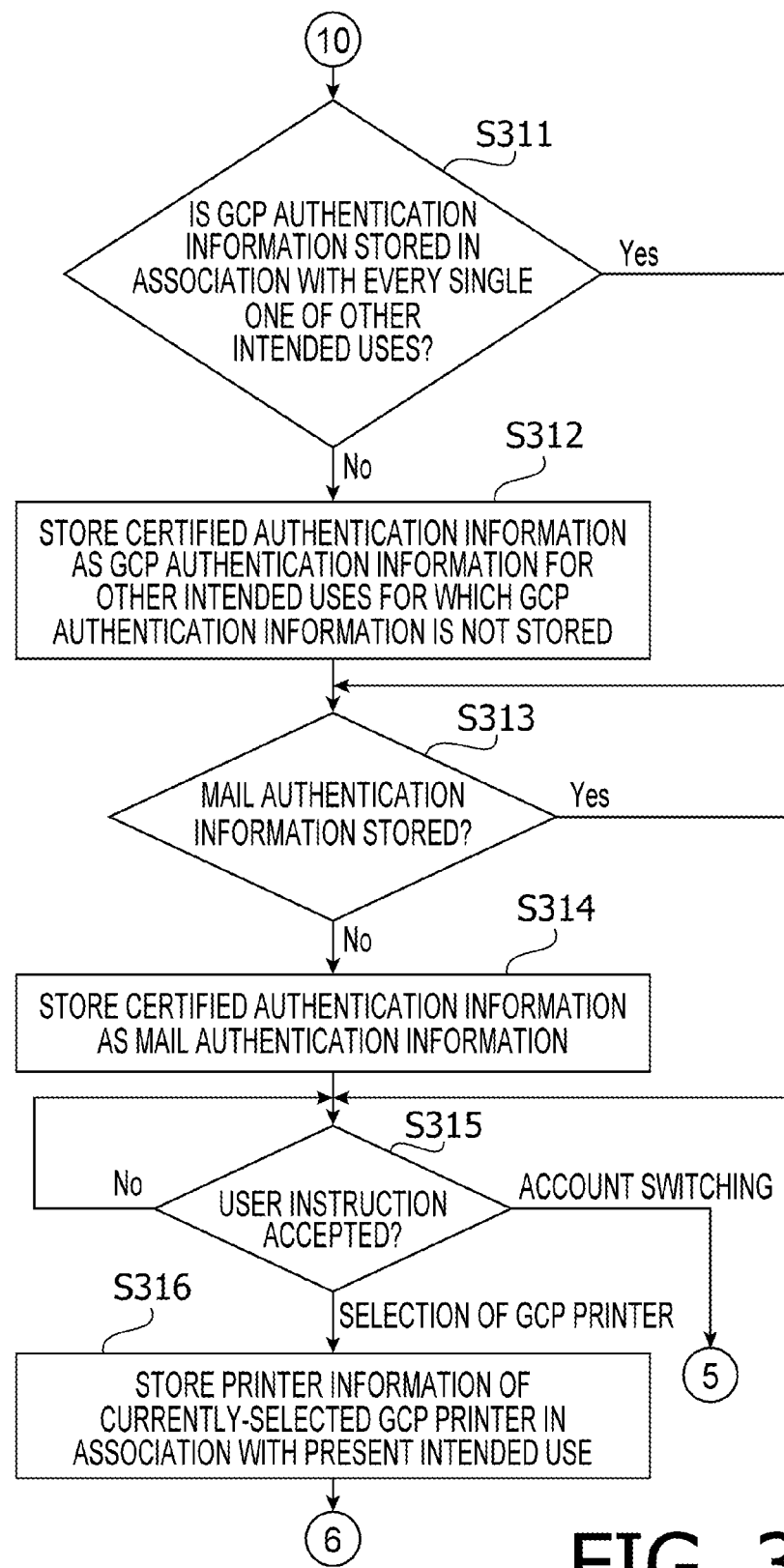
Figure 4A:
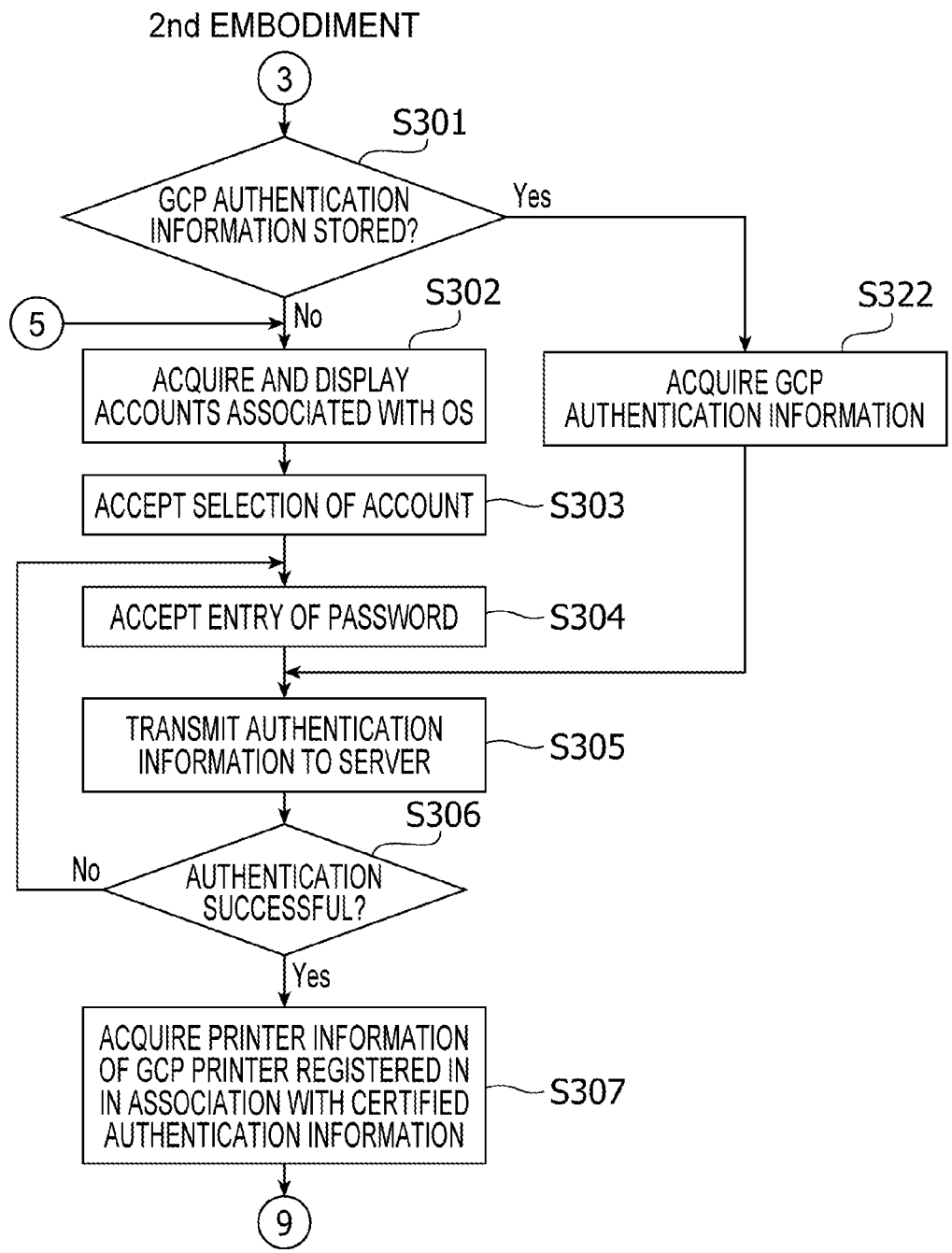
Figure 4B:
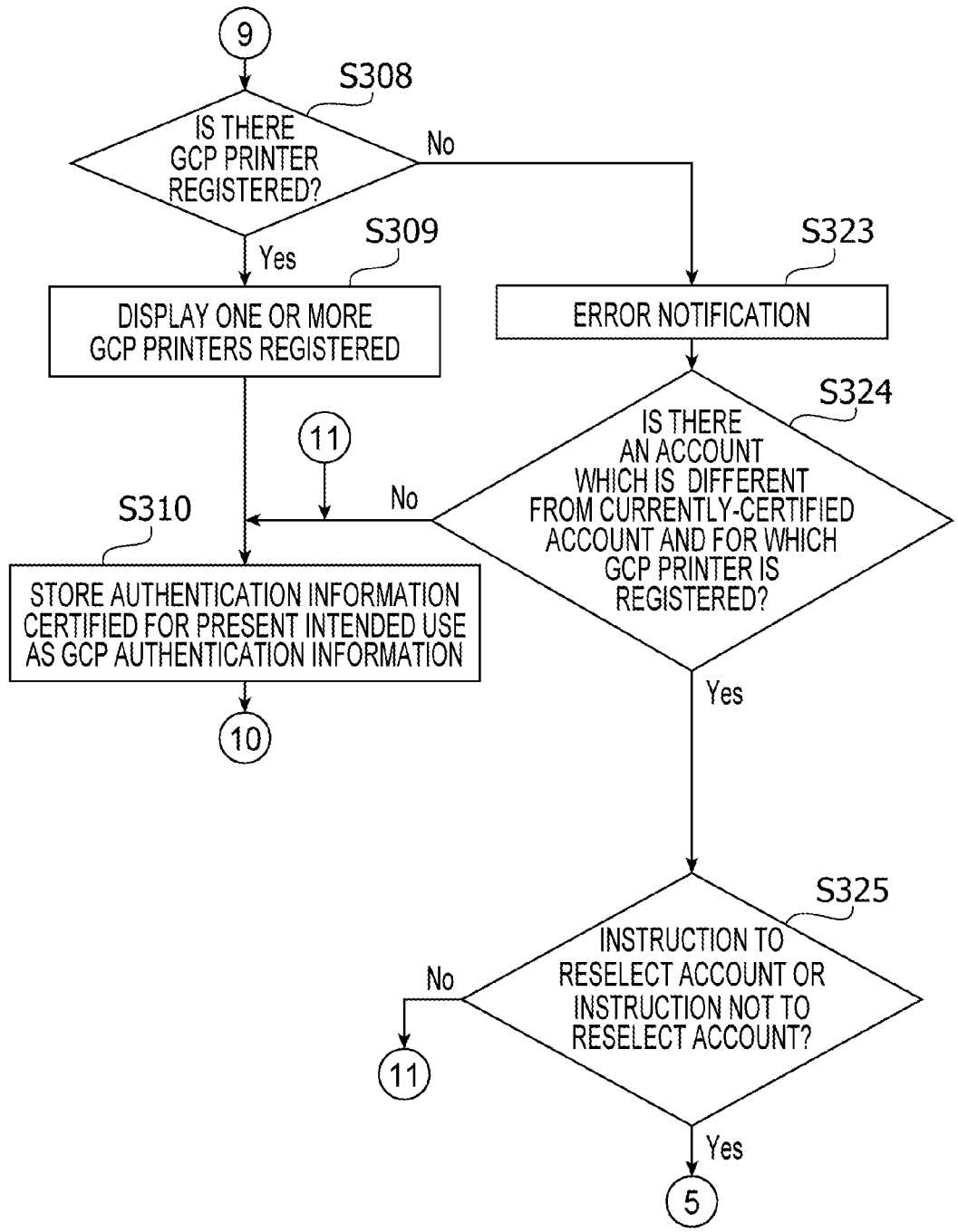
Figure 4C:
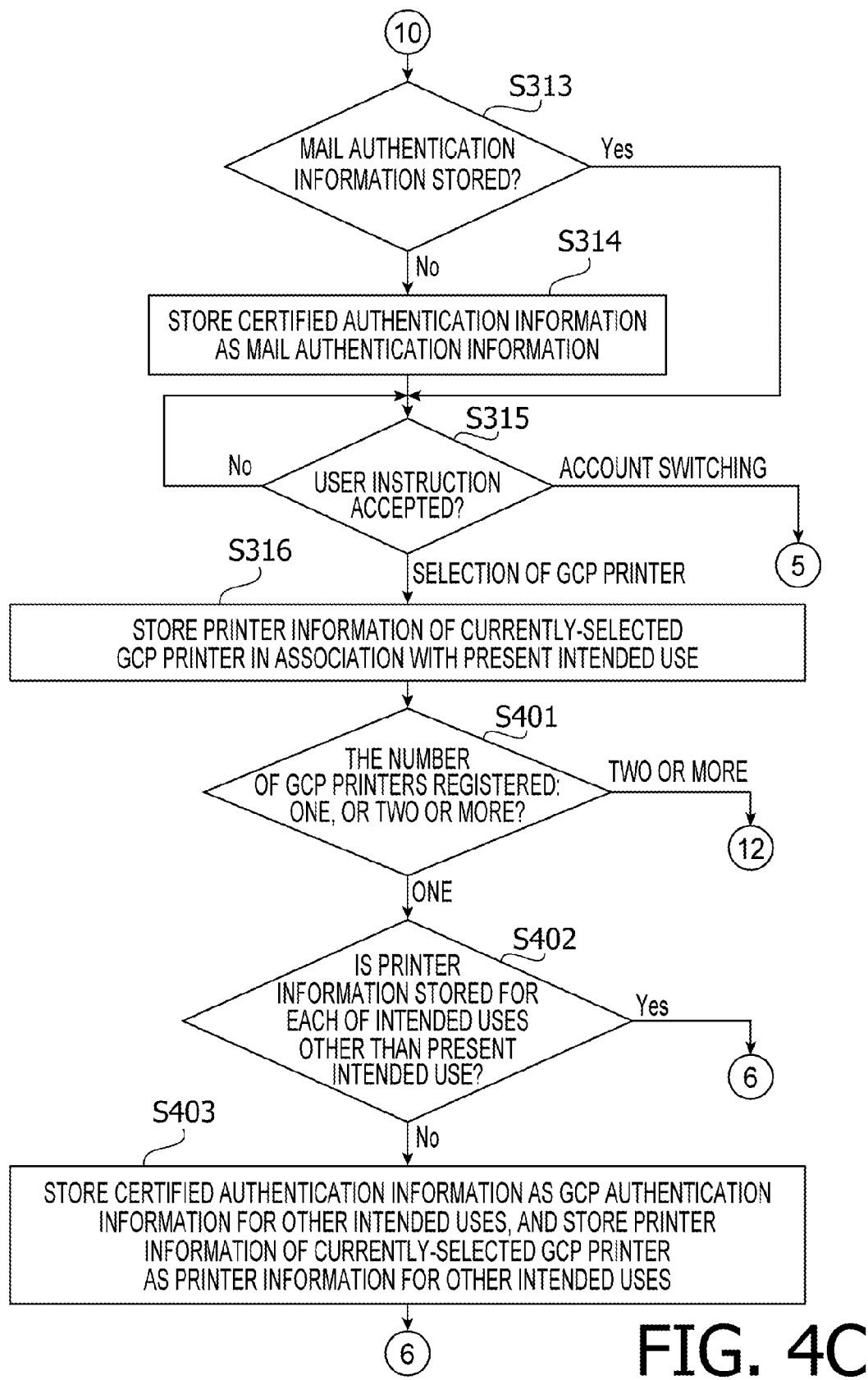
Figure 4D:
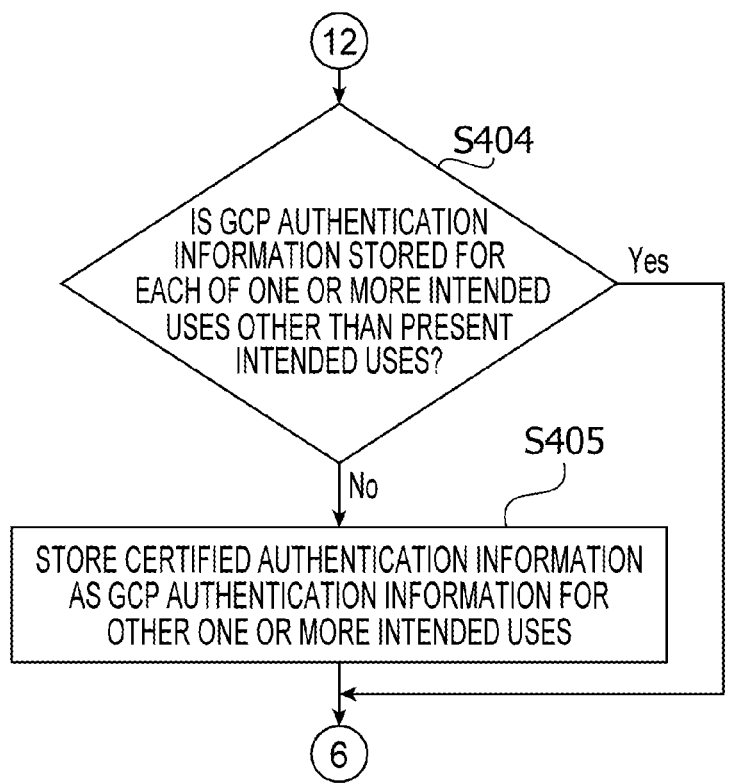

FIGS. 2A, 2B, and 2C are flowcharts showing a print process to be executed by the CPU 11 of the terminal device 10 in accordance with the application 12b. The print process is started in response to a print menu screen (not shown) being displayed on the LCD 16 after the application 12b is launched. The CPU 11 waits until a menu item is selected on the print menu screen (S201: No).

When the mail printing is selected from among selectable menu items on the print menu screen (S201: Mail Printing), the CPU 11 determines whether there is mail authentication information Ma stored in the mail authentication information storage area A1 (S202). When determining that there is not mail authentication information Ma stored in the mail authentication information storage area A1 (S202: No), the CPU 11 acquires accounts associated with the OS 12a and displays a list of the acquired accounts on the LCD 16 (S203). The accounts associated with the OS 12a are stored in a storage area, allocated to the OS 12a, in the flash memory 12.

The CPU 11 accepts a selection of an account from among the acquired accounts listed on the LCD 16 (S204). When accepting the selection of the account in S204, the CPU 11 displays an authentication information input screen (not shown) on the LCD 16, and inputs the selected account into an account input area on the authentication information input screen. The CPU 11 accepts a password input into a password input area on the authentication information input screen (S205).

After S205, the CPU 11 controls the wireless communication unit 21 to transmit the account and the password input into the respective input areas, via the AP 50, to a service providing server 300 on the Internet that is configured to perform authentication for the mail service (S206). For instance, when the mail service is Gmail™ (a trademark of Google Inc.), the service providing server 300 configured to perform authentication for the mail service is a server on which Google Inc. comprehensively manages each service. The service providing server 300 configured to perform authentication for the mail service certifies the account and the password transmitted in S206.

Meanwhile, in S202, When determining that there is mail authentication information Ma stored in the mail authentication information storage area A1 (S202: Yes), the CPU 11 acquires the mail authentication information Ma stored in the mail authentication information storage area A1 (S216). Then, the CPU 11 controls the wireless communication unit 21 to transmit an account and a password included in the acquired mail authentication information Ma, via the AP 50, to the service providing server 300 on the Internet that is configured to perform authentication for the mail service (S206). Namely, when there is mail authentication information Ma stored in the mail authentication information storage area A1, the authentication for the mail service is performed using the mail authentication information Ma, without the authentication information input screen being displayed.

According to the operations in S202 and S216, when there is mail authentication information Ma stored in the mail authentication information storage area A1, the account and the password included in the mail authentication information Ma are automatically transmitted to the service providing server 300, with no need for any operations of inputting the account and the password on the authentication information input screen. Thus, it is possible to easily perform authentication for the mail service.

When receiving via the wireless communication unit 21 a command indicating that the authentication using the account and the password transmitted in S206 is unsuccessful from the service providing server 300 as a sending source of the account and the password (S207: No), the CPU 11 goes to S205. In S205, the CPU 11 accepts an entry of a password again. In this case, the CPU 11 may again accept a selection of an account associated with the OS 12a.

Meanwhile, when receiving via the wireless communication unit 21 a command indicating that the authentication is successful from the service providing server 300 as a sending source of the account and the password (S207: Yes), the CPU 11 goes to S208. In S208, the CPU 11 stores the authentication information certified in the successful authentication (more specifically, the certified account and the certified password) as mail authentication information Ma, into the mail authentication information storage area A1 (S208).

When the authentication information certified by the service providing server 300 is not authentication information acquired by account switching, i.e., when the authentication information certified by the service providing server 300 is authentication information that the application 12b has caused the service providing server 300 to certify first (S209: No), the CPU 11 goes to S210. In S210, the CPU 11 determines whether there is GCP authentication information Ga stored in the GCP authentication information storage area A2 (S210). More specifically, in S210, the CPU 11 determines whether there is GCP authentication information Ga stored for the mail printing as one of the intended uses Gb.

When determining that there is not GCP authentication information Ga stored in the GCP authentication information storage area A2 (S210: No), the CPU 11 goes to S211. In S211, the CPU 11 stores the account and the password included in the authentication information certified in the successful authentication, as GCP authentication information Ga, into the GCP authentication information storage area A2 (S211). More specifically, in S211, the CPU 11 stores the authentication information certified in the successful authentication, as GCP authentication information Ga for the mail printing as an intended use Gb. It is noted that the mail authentication information Ma stored into the mail authentication information storage area A1 in S208 may be copied as GCP authentication information Ga.

After S211, the CPU 11 acquires a mail list corresponding to the certified authentication information from the service providing server 300 configured to provide the mail service, and displays a list of headers on the LCD 16 (S212). By selecting one of the headers listed on the LCD 16, the user is allowed to select a mail to be printed. For example, when the mail service is Gmail™ (a trademark of Google Inc.), the service providing server 300 configured to provide the mail service is a server for Gmail™.

In S210, when determining that there is GCP authentication information Ga stored in the GCP authentication information storage area A2 (S210: Yes), the CPU 11 goes to S212 without executing the operation in S211. Therefore, when there is GCP authentication information Ga already stored in the GCP authentication information storage area A2, the already-stored GCP authentication information Ga is not rewritten. Thus, it is possible to prevent the authentication information previously certified for the print service from being unintentionally rewritten.

Meanwhile, when the authentication information certified by the service providing server 300 is authentication information acquired by account switching, i.e., when the authentication information certified by the service providing server 300 is authentication information certified using another account in a state where there is mail authentication information Ma stored in the mail authentication information storage area A1 (S209: Yes), the CPU 11 goes to S217. In S217, the CPU 11 determines whether a GCP printer 30 has already been selected, i.e., whether the GCP printer 30 has ever been selected (S217).

Specifically, the CPU 11 determines that a GCP printer 30 has already been selected (S217: Yes), in the case where the CPU 11 accepted a selection of a GCP printer 30 in S315 (see FIG. 3C) when the print process was performed before. As will be described in detail below, when the CPU 11 accepted a selection of a GCP printer 30 in S315, the printer information Gc was stored into the GCP authentication information storage area A2 (see S316 in FIG. 3C). Therefore, when there is printer information Gc stored in the GCP authentication information storage area A2, the CPU 11 determines that a GCP printer 30 has already been selected (S217: Yes).

When determining that the GCP printer 30 has not been selected (S217: No), the CPU 11 acquires, from the service providing server 300 configured to provide the print service, printer information Gc of one or more GCP printers 30 registered in association with the authentication information certified this time (more specifically, printer information Gc of one or more GCP printers 30 registered in association with the account of the authentication information after account switching) (S218). For example, when the print service is Google Cloud Print™ (a trademark of Google Inc.) provided by Google Inc., the service providing server 300 configured to provide the print service is a server for Google Cloud Print™. It is noted that the printer information Gc includes the IP address and the model name of the GCP printer 30.

Based on the printer information Gc acquired from the service providing server 300, the CPU 11 determines whether there is a GCP printer 30 registered in association with the account of the authentication information after account switching (S219). When the CPU 11 has successfully acquired the printer information Gc from the service providing server 300 (e.g., when the printer information Gc received from the service providing server 300 has temporarily been stored into the RAM 13), the CPU 11 determines that there is a GCP printer 30 registered in association with the account of the authentication information after account switching (S219: Yes).

In S219, when determining that there is a GCP printer 30 registered in association with the account of the authentication information after account switching (S219: Yes), the CPU 11 goes to S220. In S220, the CPU 11 stores the authentication information certified this time (more specifically, the account and the password included in the authentication information after account switching) as GCP authentication information Ga, into the GCP authentication information storage area A2 (S220). More specifically, in S220, the CPU 11 stores the authentication information acquired by account switching, as GCP authentication information Ga for the mail printing as an intended use Gb. It is noted that the mail authentication information Ma stored into the mail authentication information storage area A1 in S208 may be copied as GCP authentication information Ga. After S220, the CPU 11 goes to S212.

Meanwhile, in S219, when determining that there is not a GCP printer 30 registered in association with the account of the authentication information after account switching (S219: No), the CPU 11 goes to S212 without executing the operation in S220. In the case of authentication information without a GCP printer 30 registered in association therewith, even though an attempt is made to utilize the print service using the authentication information, it is not possible to perform printing because there is not a GCP printer 30 as a print destination. Thus, it is possible to prevent authentication information without a GCP printer 30 registered in association therewith from being stored into the GCP authentication information storage area A2, as GCP authentication information Ga, i.e., authentication information for performing authentication for the print service.

In S217, when determining that a GCP printer 30 has already been selected (S217: Yes), the CPU 11 goes to S212, skipping S218 to S220. When a GCP printer 30 has already been selected, it is highly likely that authentication for the print service has already been performed, and that there is GCP authentication information Ga stored in the GCP authentication information storage area A2. Thus, it is possible to prevent authentication information previously certified for the print service from being unintentionally rewritten.

After S212, the CPU 11 waits until a mail to be printed is selected, or an account switching instruction to switch the account to another account is entered (S213: No and S221: No). When accepting an entry of an account switching instruction (S221: Yes), the CPU 11 goes to S203. Meanwhile, when accepting a selection of a mail to be printed (S213: Yes), the CPU 11 goes to S214, in which the CPU 11 controls the LCD 16 to preview a mail selected as an object to be printed.

In S201, when the photograph printing is selected from among the selectable menu items on the print menu screen (S201: Photograph Printing), the CPU 11 goes to S226. In S226, the CPU 11 controls the LCD 16 to display a photograph selecting screen (not shown) to prompt the user to select one or more photograph images to be printed, and accepts a selection of one or more photograph images to be printed, via the photograph selecting screen (S226). It is noted that image data of selectable photograph images is stored in the memory card MC. After S226, the CPU 11 goes to S214, in which the CPU 11 controls the LCD 16 to preview the one or more photograph images selected as objects to be printed.

After S214, the CPU 11 waits until a printer type is selected, or until a print instruction to perform printing is entered (S215: No, and S224: No). When the CPU 11 accepts a selection of the Wi-Fi printer 30 as a printer type (S215: Wi-Fi), the CPU 11 searches for one or more Wi-Fi printers 30 on the wireless LAN network 500, and displays on the LCD 16 a list of one or more Wi-Fi printers 30 retrieved on the wireless LAN network 500 (S222). The CPU 11 accepts a selection of a Wi-Fi printer 30 to be used for an intended printing operation from among the retrieved one or more Wi-Fi printers 30 listed on the LCD 16 (S223). After S223, the CPU 11 goes to S214.

Meanwhile, when the CPU 11 accepts a selection of the GCP printer 30 as a printer type (S215: GCP), the CPU 11 goes to S301 (see FIG. 3A). In S301, the CPU 11 determines whether there is GCP authentication information Ga stored in the GCP authentication information storage area A2 (S301). More specifically, in S301, the CPU 11 determines whether there is GCP authentication information Ga stored in association with the intended use Gb corresponding to the type (mail or photograph) of the image(s) currently selected as object(s) to be printed.

In S301, when determining that there is not GCP authentication information Ga stored in the GCP authentication information storage area A2 (S301: No), the CPU 11 executes S302 to S304 in the same manner as the aforementioned steps S203 to S205. After S304, the CPU 11 controls the wireless communication unit 21 to transmit the account and the password input into the respective input areas, via the AP 50, to a service providing server 300 on the Internet 800 that is configured to perform authentication for the print service (S305). The service providing server 300 configured to perform authentication for the print service certifies the account and the password transmitted in S305. For instance, when the print service is Google Cloud Print™ (a trademark of Google Inc.), the service providing server 300 configured to perform authentication for the print service is a server on which Google Inc. comprehensively manages each service.

Meanwhile, in S301, when determining that there is GCP authentication information Ga stored in the GCP authentication information storage area A2 (S301: Yes), the CPU 11 acquires the GCP authentication information Ga stored in the GCP authentication information storage area A2 (S322). Then, the CPU 11 controls the wireless communication unit 21 to transmit the account and the password included in the acquired GCP authentication information Ga, via the AP 50, to the service providing server 300 configured to perform authentication for the print service (S305). Namely, when there is GCP authentication information Ga stored in the GCP authentication information storage area A2, the authentication for the print service is performed using the GCP authentication information Ga, without the authentication information input screen being displayed.

According to the operations in S301 and S322, when there is GCP authentication information Ga stored in the GCP authentication information storage area A2, the account and the password included in the GCP authentication information Ga are automatically transmitted to the service providing server 300, with no need for any operations of inputting the account and the password on the authentication information input screen. Thus, it is possible to easily perform authentication for the print service.

When receiving via the wireless communication unit 21 a command indicating that the authentication using the account and the password transmitted in S205 is unsuccessful from the service providing server 300 as a sending source of the account and the password (S306: No), the CPU 11 goes to S304. In S304, the CPU 11 accepts an entry of a password again. In this case, the CPU 11 may accept a selection of an account associated with the OS 12a.

Meanwhile, when receiving via the wireless communication unit 21 a command indicating that the authentication is successful from the service providing server 300 as a sending source of the account and the password (S306: Yes), the CPU 11 goes to S307. In S307, the CPU 11 acquires, from the service providing server 300 configured to provide the print service, printer information Gc of one or more GCP printers 30 registered in association with the authentication information certified in the successful authentication (S307).

Based on the printer information Gc acquired from the service providing server 300, the CPU 11 determines whether there is a GCP printer 30 registered in association with the account included in the authentication information certified in the successful authentication (S308). When the CPU 11 has (successfully) acquired the printer information Gc from the service providing server 300 (e.g., when the printer information Gc received from the service providing server 300 has temporarily been stored into the RAM 13), the CPU 11 determines that there is a GCP printer 30 registered in association with the account included in the authentication information certified in the successful authentication (S308: Yes).

In S308, when determining that there is a GCP printer 30 registered in association with the account included in the authentication information certified in the successful authentication (S308: Yes), the CPU 11 displays on the LCD 16 a list of one or more GCP printers 30 registered in association with the account included in the authentication information certified in the successful authentication (S309).

After S309, the CPU 11 stores, as GCP authentication information Ga, the account and the password included in the authentication information certified in the successful authentication into the GCP authentication information storage area A2 (S310). More specifically, in S310, the CPU 11 stores the account and the password included in the authentication information certified in the successful authentication, as GCP authentication information Ga for the present intended use Gb, i.e., the intended use Gb corresponding to the type (mail or photograph) of the image(s) currently selected as object(s) to be printed. Thus, it is possible to associate GCP authentication information Ga with each intended use Gb.

The CPU 11 determines whether GCP authentication information Ga is stored in the GCP authentication information storage area A2 in association with every single one of one or more intended uses Gb other than the present intended use Gb (S311). When determining that GCP authentication information Ga is not stored in association with every single one of the one or more intended uses Gb other than the present intended use Gb, i.e., when determining that there are one or more intended uses Gb for which GCP authentication information Ga is not stored (S311: No), the CPU 11 goes to S312. In S312, the CPU 11 stores the account and the password included in the authentication information certified in the successful authentication, as GCP authentication information Ga for the one or more intended uses Gb for which GCP authentication information Ga is not stored, of the other one or more intended uses Gb than the present intended use Gb (S312). It is noted that, in S312, the GCP authentication information Ga stored in association with the present intended use Gb in S310 may be copied for the one or more intended uses Gb for which GCP authentication information Ga is not stored, of the other one or more intended uses Gb than the present intended use Gb. After S312, the CPU 11 goes to S313. Meanwhile, when determining that GCP authentication information Ga is stored in the GCP authentication information storage area A2 in association with every single one of the one or more intended uses Gb other than the present intended use Gb (S311: Yes), the CPU 11 skips S312 and goes to S313.

According to the operations in S311 and S312, when there are a plurality of intended uses Gb, it is possible to reflect the GCP authentication information Ga in not only the present intended use Gb but also other one or more intended uses Gb. Further, regarding one or more intended uses Gb for which GCP authentication information Ga has already been stored, it is not possible to rewrite contents of the GCP authentication information Ga. Therefore, it is possible to prevent GCP authentication information previously stored in association with an intended use Gb from being unintentionally rewritten.

In S313, the CPU 11 determines whether there is mail authentication information Ma stored in the mail authentication information storage area A1 (S313). When determining that there is not mail authentication information Ma stored in the mail authentication information storage area A1 (S313: No), the CPU 11 stores, as mail authentication information Ma, the account and the password included in the authentication information certified in the successful authentication into the mail authentication information storage area A1 (S314). It is noted that the GCP authentication information Ga stored into the GCP authentication information storage area A2 in S307 may be copied as mail authentication information Ma. After S314, the CPU 11 goes to S315.

Meanwhile, when determining that there is mail authentication information Ma stored in the mail authentication information storage area A1 (S313: Yes), the CPU 11 skips S314 and goes to S315. Thereby, when there is mail authentication information Ma stored in the mail authentication information storage area A1, it is not possible to rewrite contents of the mail authentication information Ma. Thus, it is possible to prevent authentication information previously certified for the mail service from being intentionally rewritten.

In S315, the CPU 11 waits until the CPU 11 accepts a user instruction (S315: No). When accepting an entry of an account switching instruction to switch the account to another account (S315: Account Switching), the CPU 11 goes to S302.

Meanwhile, when accepting an entry of a user instruction to select a GCP printer 30 from among the one or more GCP printers 30 listed on the LCD 16 in S309 (S315: Selection of GCP Printer), the CPU 11 goes to S316.

In S316, the CPU 11 stores printer information Gc corresponding to the currently-selected GCP printer 30 in association with the present intended use Gb (S316). Thereby, it is possible to associate the GCP authentication information Ga stored in S310 and the printer information Gc corresponding to the currently-selected printer 30, with the present intended use Gb.

In S308, when determining that there is not a GCP printer 30 registered in association with the account included in the authentication information certified in the successful authentication (S308: No), the CPU 11 goes to S323. In S323, the CPU 11 displays on the LCD 16 an error notification (S323). Subsequently, the CPU 11 determines whether there is an account, which is different from the currently-certified account and for which a GCP printer 30 is registered, of the accounts associated with the OS 12a (S324). The CPU 11 makes the determination in S324 based on an inquiry to the service providing server 300 configured to provide the print service.

When determining that there is an account, which is different from currently-certified accounts and for which a GCP printer 30 is registered, of the accounts associated with the OS 12a (S324: Yes), the CPU 11 goes to S325. In S325, the CPU 11 displays on the LCD 16 an inquiry as to whether to reselect an account and waits until the CPU 11 accepts an entry of an instruction to reselect an account or an instruction not to reselect an account (S325). When accepting an entry of an instruction to reselect an account (S325: Yes), the CPU 11 goes to S302.

In the case of an account without a GCP printer 30 registered in association therewith, even though an attempt is made to utilize the print service using the account, it is not possible to perform printing because there is not a GCP printer 30 as a print destination. According to the operation in S325, it is possible to reselect an account with a GCP printer 30 registered in association therewith. Thus, it is possible to prevent authentication information without a GCP printer 30 registered in association therewith from being stored into the GCP authentication information storage area A2, as GCP authentication information Ga, i.e., authentication information for performing authentication for the print service.

Meanwhile, in S325, when accepting an entry of an instruction not to reselect an account (S325: No), the CPU 11 goes to S310. Thus, it is possible to store, as needed, even authentication information without a GCP printer 30 registered in association therewith, as GCP authentication information Ga. It is noted that, when the CPU 11 executes S310 and subsequent steps in response to a negative determination in S324 or S325, there is not a GCP printer 30 registered in association with the account included in the authentication information certified in the successful authentication. In this case, it is not possible to issue an instruction to select a GCP printer 30 as a user instruction. Namely, in this case, the CPU 11 only accepts an account switching instruction to switch the account to another account, in S315.

Referring back to FIG. 2A, in S201, when account management is selected on the print menu screen (S201: Account Management), the CPU 11 performs an account certifying process (S227). The account certifying process in S227 is the same as the aforementioned steps S203 to S207 or S302 to S306.

In this respect, however, the service providing server 300 to which the authentication information is to be transmitted is a previously-determined one of the service providing server 300 configured to perform authentication for the mail service and the service providing server 300 configured to perform authentication for the print service. Alternatively, when the service providing server 300 configured to perform authentication for the mail service and the service providing server 300 configured to perform authentication for the print service are the same, the same service providing server 300 may be a destination to which the authentication information is to be transmitted.

After S227, the CPU 11 stores, as mail authentication information Ma, the account and the password included in the certified authentication information into the mail authentication information storage area A1, and stores, as GCP authentication information Ga, the account and the password included in the certified authentication information into the GCP authentication information storage area A1 (S228). More specifically, the CPU 11 executes S228 when receiving via the wireless communication unit 21 a command indicating the successful authentication, from the service providing server 300 to which the account and the password are to be transmitted.

In S228, the CPU 11 stores the certified authentication information as GCP authentication information Ga in association with every intended use Gb stored in the GCP authentication information storage area A2. Alternatively, the CPU 11 may store the certified authentication information as GCP authentication information Ga in association with a specific intended use Gb. After S228, the CPU 11 goes to S201.

According to the operations in S228, when the account certifying process is performed responsive to a selection of a menu option specifically for account management, the certified authentication information is stored as GCP authentication information Ga for every service available to the application 12b (in the first illustrative embodiment, the mail service and the print service). Therefore, it is possible to utilize, as authentication information for every service available to the application 12b, authentication information input on an authentication information input screen displayed in response to the selection of the menu option specifically for account management.

When accepting a print instruction to perform printing in S224 (S224: Yes), the CPU 11 causes a currently-selected printer 30 to print an image of the mail to be printed or the one or more photograph images to be printed (S225). Thereafter, the CPU 11 terminates the print process.

Specifically, when a Wi-Fi printer 30 to be used for an intended printing operation is selected in S223, the CPU 11 controls the wireless communication unit 21 to transmit image data of one or more images to be printed and print settings, to the selected Wi-Fi printer 30 via the AP 50.

Meanwhile, when a GCP printer 30 is selected based on the selection accepted in S315, the CPU 11 controls the wireless communication unit 21 to transmit image data of one or more images to be printed, print settings, and the printer information corresponding to the selected GCP printer 30, to the service providing server 300 configured to provide the print service, on the Internet 800, via the AP 50.

Further, even though any Wi-Fi printer 30 is not selected, and any GCP printer 30 is not selected, when there is printer information Gc stored in the GCP authentication information storage area A2 in association with the present intended use Gb in a previously-executed print process, the CPU 11 controls the wireless communication unit 21 to transmit image data of one or more images to be printed, print settings, and the printer information Gc, to the service providing server 300 configured to provide the print service, on the Internet 800, via the AP 50. Thereby, it is possible to perform printing with a GCP printer 30 corresponding to the printer information Gc associated with the present intended use Gb. Thus, it is possible to use, as a default printer, the GCP printer 30 corresponding to the printer information Gc associated with the present intended use Gb.

According to the first illustrative embodiment, when authentication information input on the authentication information input screen displayed in response to one service being selected is successfully certified by the service providing server 300 configured to perform authentication for the one service, the certified authentication information is stored into a corresponding authentication information storage area (such as the mail authentication information storage area A1 and the GCP authentication information storage area A2). On the other hand, the certified authentication information is stored into a different authentication information storage area for a different service. Therefore, it is possible to utilize the certified authentication information as authentication information for performing authentication for the different service. Further, when the account for the one service is switched, the account for the different service is switched as well accordingly.

Accordingly, it is possible to use the authentication information certified for the one service, for another purpose of performing authentication for the different service. Therefore, it is possible to easily apply authentication information to each of a plurality of services that need authentication using the authentication information. Particularly, as exemplified above, when a mail acquired via the mail service is printed via the print service, it is not required to input authentication information for each individual service. Thus, the user is able to enjoy user-friendliness when utilizing the services, which need authentication, in coordination.

According to the first illustrative embodiment, for the print service, GCP authentication information Ga is associated with each intended use Gb. Therefore, it is possible to properly use accounts for each of which a GCP printer 30 corresponding to a specific intended use Gb is registered. Further, since GCP authentication information Ga is associated with each intended use Gb, it is possible to set a default GCP printer 30 for each intended use Gb. Furthermore, by changing the GCP printer 30 to be used, it is possible to change the printer information Gc corresponding to the present intended use Gb. Namely, it is user-friendly that it is possible to change the default GCP printer 30 as required for each intended use Gb.

Subsequently, referring to FIGS. 4A, 4B, 4C, and 4D, an explanation will be provided about a second illustrative embodiment according to aspects of the present disclosure. In the second illustrative embodiment, substantially the same elements as those in the first illustrative embodiment will be provided with the same reference characters, and detailed explanations thereof will be omitted. FIGS. 4A, 4B, 4C, and 4D are flowcharts showing a procedure of a print process to be executed by the CPU 11 in accordance with an application 12b in the second illustrative embodiment. Hereinafter, differences between the first illustrative embodiment and the second illustrative embodiment will mainly be described.

In the second illustrative embodiment, the number of GCP printers 30 registered in association with the account of the authentication information certified in S306 is considered. In the second illustrative embodiment, S311 and S312 are omitted. Instead, S401 to S405 are added as steps to be executed by the CPU 11.

Specifically, after S316, the CPU 11 determines whether the number of GCP printers registered in association with the account of the currently-certified authentication information (i.e., the authentication information certified in S306) is one, or two or more (S401). When determining that the number of GCP printers registered in association with the account of the currently-certified authentication information (i.e., the authentication information certified in S306) is one (S401: One), the CPU 11 goes to S402. In S402, the CPU 11 determines whether printer information Gc is stored for each of one or more intended uses Gb other than the present intended use Gb, in the GCP authentication information storage area A2 (S402).

When determining that printer information Gc is stored for each of one or more intended uses Gb other than the present intended use Gb, in the GCP authentication information storage area A2 (S402: No), the CPU 11 goes to S403. In S403, the CPU 11 stores the currently-certified authentication information as GCP authentication information Ga for one or more intended uses Gb, for which printer information Gc is not stored, of the one or more intended uses Gb other than the present intended use Gb. Further, in S403, the CPU 11 stores printer information corresponding to the currently-selected GCP printer 30 as printer information Gc for the one or more intended uses Gb for which printer information Gc is not stored (S403). After S403, the CPU 11 goes to S215 (see FIG. 2C). When determining that printer information Gc is stored for each of one or more intended uses Gb other than the present intended use Gb, in the GCP authentication information storage area A2 (S402: Yes), the CPU 11 skips S403 and goes to S215.

Meanwhile, in S401, When determining that the number of GCP printers registered in association with the account of the currently-certified authentication information is two or more (S401: Two or More), the CPU 11 goes to S404. In S404, the CPU 11 determines whether GCP authentication information Gb is stored for each of one or more intended uses Gb other than the present intended use Gb, in the GCP authentication information storage area A2 (S404).

When determining that GCP authentication information Gb is not stored for each of one or more intended uses Gb other than the present intended use Gb, in the GCP authentication information storage area A2 (S404: No), the CPU 11 goes to S405. In S405, the CPU 11 stores the currently-certified authentication information as GCP authentication information Ga for one or more intended uses Gb, for which GCP authentication information Gb is not stored, of the one or more intended uses Gb other than the present intended use Gb (S405). After S405, the CPU 11 goes to S215. Meanwhile, when determining that GCP authentication information Gb is stored for each of one or more intended uses Gb other than the present intended use Gb, in the GCP authentication information storage area A2 (S404: Yes), the CPU 11 skips S405 and goes to S215.

According to the second illustrative embodiment, when the number of GCP printers 30 registered for the account of the currently-certified authentication information is one, the GCP authentication information Ga stored for the present intended use Gb is associated with one or more intended uses Gb other than the present intended use Gb. Therefore, it is possible to easily associate GCP authentication information Ga with each intended use Gb. In this case, it is possible to associate the printer information Gc identifying the currently-selected GCP printer 30 (i.e., a single GCP printer 30 of one or more registered GCP printers 30) with one or more intended uses Gb other than the present intended use Gb. Thus, it is possible to easily associate printer information Gc with each intended use Gb.

Particularly, the printer information Gc associated with the present intended use Gb is associated only with one or more intended uses Gb for which printer information Gc is not stored. Therefore, it is possible to prevent printer information Gc previously associated with an intended use Gb from being unintentionally rewritten. Further, since an intended use Gb for which printer information Gc is stored is highly likely to be already associated with GCP authentication information Ga, it is possible to prevent the GCP authentication information Ga from being unintentionally rewritten.

Further, according to the second illustrative embodiment, when the number of GCP printers 30 registered for the account of the currently-certified authentication information is two or more, the GCP authentication information Ga stored for the present intended use Gb is associated with one or more intended uses Gb other than the present intended use Gb. Thus, it is possible to easily associate GCP authentication information Ga with each intended use Gb.

Meanwhile, the printer information Gc identifying the currently-selected GCP printer 30 is not stored for one or more intended uses Gb other than the present intended use Gb. When the number of GCP printers 30 registered for the account of the currently-certified authentication information is two or more, there may be a possibility that the user has an intention to properly use the two or more GCP printers 30 according to a intended uses Gb. According to the second illustrative embodiment, it is possible to meet the possibility, that is, to properly associate the two or more GCP printers 30 with intended uses Gb.

Especially, the GCP authentication information Ga associated with the present intended use Gb is reflected only in an intended use Gb for which GCP authentication information Ga is not stored. Therefore, it is possible to prevent GCP authentication information Ga previously associated with an intended use Gb from being unintentionally rewritten.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modification>

In the aforementioned illustrative embodiments, the terminal device 10 has the application 12b installed thereon. Nevertheless, the application 12b may be installed on another information processing device such as a personal computer, a tablet terminal device, a digital camera, and a music reproduction device. Further, in the aforementioned illustrative embodiments, the Android OS is exemplified as the OS 12a installed on the terminal device 10. Nevertheless, another OS may be installed on the terminal device 10.

In the aforementioned illustrative embodiments, a printer only having a print function is illustrated as an example of each printer 30. Nevertheless, a multi-function peripheral having one or more other functions as well as a print function may be employed instead.

In the aforementioned illustrative embodiments, the print service and the mail service are exemplified as services available to the application 12b. Nevertheless, aspects of the present disclosure may be applied to other services that the service providing servers 300 are allowed to provide, such as a storage service utilizing a data storage function of the service providing servers 300 and a scanning service for scanning a document with a remote scanner on the Internet 800. For instance, when the application 12b is configured to use the storage service besides the print service, and data of an image printed using the print service is stored into a service providing server 300 using the storage service, it is user-friendly that there is no need to input authentication information for each service, in the same manner as the aforementioned illustrative embodiments.

In the aforementioned illustrative embodiments, exemplified are the mail service and the print service provided by Google Inc. Nevertheless, aspects of the present disclosure may be applied between services provided by respective different service providers.

In the aforementioned illustrative embodiments, authentication information certified for a service is applied to authentication for another service. Nevertheless, authentication information certified for a service may be applied not to all services available to the application 12b but to previously-determined one or more services.

In the aforementioned illustrative embodiments, for instance, in the case of successful authentication for the mail service, the certified authentication information is stored into the mail authentication information storage area A1 and as well into the GCP authentication information storage area A2 corresponding to the print service that is different from the mail service. Nevertheless, instead, the certified authentication information may not be stored into the GCP authentication information storage area A2. In this case, when the CPU 11 determines that there is not GCP authentication information Ga stored in the GCP authentication information storage area A2 (S301: No), and there is mail authentication information Ga stored in the mail authentication information storage area A1, the CPU 11 may acquire the mail authentication information Ga from the mail authentication information storage area A1 and apply the acquired mail authentication information Ga to authentication for the print service. Alternatively, a storage area for storing authentication information may be configured to be used in common for each service. According to the configuration, in each of the case of successful authentication for the mail service and the case of successful authentication for the print service, the certified authentication information may be stored into the storage area common to each service. When there is authentication information stored in the storage area common to each service, the CPU 11 may acquire the stored authentication information and apply the acquired authentication information to authentication for each service.

In the aforementioned illustrative embodiments, in S208 and S310, the CPU 11 stores authentication information certified in successful authentication into the mail authentication information storage area A1 or the GCP authentication information storage area A2. Namely, the CPU 11 executes the operation in S208 in response to the affirmative determination in S207 (S207: Yes), or executes the operation in S310 provided that the CPU 11 makes the affirmative determination in S306 (S306: Yes). Instead, for instance, prior to the determination in S207 or S306, i.e., regardless of whether the authentication by a corresponding service providing server 300 is successful, the CPU 11 may store the authentication information transmitted to the corresponding service providing server 300 into the mail authentication information storage area A1 or the GCP authentication information storage area A2.

In the aforementioned illustrative embodiments, the mail authentication information storage area A1 and the GCP authentication information storage area A2 are provided in the memory card MC. Nevertheless, the mail authentication information storage area A1 and the GCP authentication information storage area A2 may be provided in an internal memory of the terminal device 10 such as the flash memory 12b.

In the aforementioned illustrative embodiments, as intended uses of printing available to the application 12b, the photograph printing and the mail printing are exemplified. Nevertheless, aspects of the present disclosure may be applied to other uses of printing such as document printing and Web page printing.

In the aforementioned illustrative embodiments, GCP authentication information Ga is stored in association with each individual intended use Gb, in the GCP authentication information storage area A2. Nevertheless, irrespective of the intended uses Gb, a single piece of GCP authentication information Ga may be stored in the GCP authentication information storage area A2. Further, the printer information Gc may not be associated with the GCP authentication information Ga.

In the aforementioned illustrative embodiments, a correlation between authentication information (more specifically, an account) and one or more GCP printers 30 registered for the authentication information is managed by a service providing server 300 that provides an intended one of the services. Further, in S218 and S307, the CPU 11 acquires printer information corresponding to the authentication information as target information in each of S218 and S307 from the service providing server 300. Instead, a correlation between authentication information and one or more GCP printers 30 registered for the authentication information may be stored in a storage device accessible by the CPU 11 such as the flash memory 12 and the memory card MC. Further, the CPU 11 may acquire printer information from the storage device in each of S218 and S307.

In the aforementioned illustrative embodiments, for example, when the mail service is Gmail™ (a trademark of Google Inc.), authentication for the mail service is performed by a server on which Google Inc. comprehensively manages each service. Nevertheless, authentication for the mail service may be performed by a mail server for the mail service. Namely, the service providing server 300 configured to perform authentication for the mail service may be the same as the service providing server 300 configured to provide the mail service. The same may apply to the print service.

In the aforementioned illustrative embodiments, when the menu option specifically for account management is selected, the one authentication information input screen is displayed irrespective of the services. Instead, the terminal device 10 may be configured to enable the user to select one of respective authentication screens for the mail service and the print service, after selecting the menu option specifically for account management. In this case, the terminal device 10 may be configured to enable the user to input authentication information for each service. Further, when the terminal device 10 is configured to store authentication information for each intended use Gb in the same manner as the print service of the aforementioned illustrative embodiments, the terminal device 10 may be configured to enable the user to select one of respective authentication screens for the intended uses Gb and to input authentication information for each intended use Gb.

In the aforementioned illustrative embodiments, in S217, when there is printer information Gc stored in the GCP authentication information storage area A2, the CPU 11 determines that a GCP printer 30 has already been selected. Nevertheless, for instance, when accepting a selection of a GCP printer 30 in S315, the CPU 11 may store information on the acceptance of the selection of the GCP printer 30 into the storage area for application within the memory card MC. Further, the CPU 11 may determine whether a GCP printer 30 has been selected, based on information stored in the storage area for application.

In the aforementioned illustrative embodiments, in S310, GCP authentication information Ga is stored for the present intended use Gb, and thereafter, in S316, the printer information Gc corresponding to the currently-selected GCP printer 30 is stored for the present intended use Gb. Nevertheless, for instance, the operation in S310 may be omitted. Further, in S316, the CPU 11 may store the GCP authentication information Ga and the printer information Gc corresponding to the currently-selected GCP printer 30 in association with the present intended use Gb.

The aforementioned illustrative embodiments and modifications have been described based on such a configuration that the CPU 11 performs each operation shown in FIGS. 2A to 3C. Nevertheless, a plurality of CPUs may perform each operation shown in FIGS. 2A to 3C in cooperation with each other. Further, one or more circuits such as application specific integrated circuits (hereinafter referred to as ASICs) may perform each operation shown in FIGS. 2A to 3C, solely or in cooperation with each other. Furthermore, the CPU 11 and one or more circuits such as ASICs may perform each operation shown in FIGS. 2A to 3C in cooperation with each other.

A part of the operations shown in FIGS. 2A to 3C may be omitted or changed within the scope of the technical concept as expressed in the present disclosure. For instance, the operations in S209, and S217 to S220 may be omitted. Further, the operation in S308, S323 to S325, S311, and S312 may be omitted. In addition, instead of S217, the same determining operation as S210 may be made. Furthermore, instead of S402, the same determining operation as S404 may be made.

What is claimed is:

1. An information processing device comprising:
a communication unit;
a display unit; and
a controller configured to:
accept a selection of a service from among a plurality of services, the plurality of services including at least a first service and a second service, the second service being different from the first service;
control the display unit to display an authentication screen for inputting authentication information thereon;
when accepting a selection of the first service, control the communication unit to transmit authentication information input on the authentication screen displayed in response to acceptance of the selection of the first service, to a first external device configured to perform authentication for the first service;
when the authentication for the first service has been successfully performed using the authentication information transmitted to the first external device, store the authentication information used for the successful authentication for the first service, into a storage coupled with the controller; and
when accepting a selection of the second service and the authentication information used for the successful authentication for the first service is stored in the storage, control the communication unit to transmit the authentication information stored in the storage to a second external device configured to perform authentication for the second service.

2. A method adapted to be implemented on a processor coupled with a communication unit, a display unit, and a storage, the method comprising:
accepting a selection of a service from among a plurality of services, the plurality of services including at least a first service and a second service, the second service being different from the first service;
displaying, on the display unit, an authentication screen for inputting authentication information thereon;
when accepting a selection of the first service, transmitting, via the communication unit, authentication information input on the authentication screen displayed in response to acceptance of the selection of the first service, to a first external device configured to perform authentication for the first service;
when the authentication for the first service has been successfully performed using the authentication information transmitted to the first external device, storing, into the storage, the authentication information used for the successful authentication for the first service; and
when accepting a selection of the second service and the authentication information used for the successful authentication for the first service is stored in the storage, transmitting, via the communication unit, the authentication information stored in the storage to a second external device configured to perform authentication for the second service.

3. A non-transitory computer-readable medium storing computer-readable instructions that are executable by a processor coupled with a communication unit, a display unit, and a storage, the instructions being configured to, when executed by the processor, cause the processor to:
accept a selection of a service from among a plurality of services, the plurality of services including at least a first service and a second service, the second service being different from the first service;
control the display unit to display an authentication screen for inputting authentication information thereon;
when accepting a selection of the first service, control the communication unit to transmit authentication information input on the authentication screen displayed in response to acceptance of the selection of the first service, to a first external device configured to perform authentication for the first service;

when the authentication for the first service has been successfully performed using the authentication information transmitted to the first external device, store, into the storage, the authentication information used for the successful authentication for the first service; and when accepting a selection of the second service and the authentication information used for the successful authentication for the first service is stored in the storage, control the communication unit to transmit the authentication information stored in the storage to a second external device configured to perform authentication for the second service.

4. The non-transitory computer-readable medium according to claim 3, wherein the storage comprises:
a first storage area configured to store authentication information for the first service; and
a second storage area configured to store authentication information for the second service, and wherein the instructions are configured to, when executed by the processor, cause the processor to:
change the authentication information for the first service that is stored in the first storage area, to another piece of authentication information;
in response to transmission of the another piece of authentication information to the first external device, store the another piece of authentication information into the first storage area as authentication information for the first service, and store the another piece of authentication information into the second storage area as authentication information for the second service; and
control the communication unit to transmit the another piece of authentication information stored in the second storage area to the second external device configured to perform authentication for the second service.

5. The non-transitory computer-readable medium according to claim 4, wherein the instructions are configured to, when executed by the processor, cause the processor to:
acquire device information regarding one or more devices usable in the second service, the device information corresponding to the another piece of authentication information;
determine whether a device usable in the second service is associated with the another piece of authentication information transmitted to the first external device, based on the acquired device information;
when determining that a device usable in the second service is associated with the another piece of authentication information transmitted to the first external device, store the another piece of authentication information into the second storage area as authentication information for the second service; and
when determining that a device usable in the second service is not associated with the another piece of authentication information transmitted to the first external device, preserve authentication information previously stored in the second storage area, without storing into the second storage area the another piece of authentication information.

6. The non-transitory computer-readable medium according to claim 4, wherein the instructions are configured to, when executed by the processor, cause the processor to:

accept a selection of a device to be used in the second service;

when the selection of a device to be used in the second service has not been accepted, store the authentication information transmitted to the first external device into the second storage area as authentication information for the second service; and when the selection of a device to be used in the second service has been accepted, preserve authentication information previously stored in the second storage area, without storing the authentication information transmitted to the first external device into the second storage area.

7. The non-transitory computer-readable medium according to claim 3, wherein the storage comprises:
a first storage area configured to store authentication information for the first service; and
a second storage area configured to store authentication information for the second service, and wherein the instructions are configured to, when executed by the processor, cause the processor to:
store the authentication information transmitted to the first external device into the first storage area as authentication information for the first service;
store the authentication information transmitted to the first external device into the second storage area as authentication information for the second service, provided that there is not authentication information for the second service stored in the second storage area; and
control the communication unit to transmit the authentication information stored in the second storage area to the second external device configured to perform authentication for the second service.

8. The non-transitory computer-readable medium according to claim 3, wherein the storage comprises a specific storage area configured to, when there are two or more intended uses of one or more devices usable in the first service, store authentication information for the first service in association with each individual one of the two or more intended uses, and wherein the instructions are configured to, when executed by the processor, cause the processor to:
select one of the two or more intended uses; and
store the authentication information transmitted to the first external device into the specific storage area in association with the selected one of the two or more intended uses.

9. The non-transitory computer-readable medium according to claim 8, wherein the instructions are configured to, when executed by the processor, cause the processor to:
select one of the two or more intended uses; and
store the authentication information transmitted to the first external device into the specific storage area in association with an intended use, in association with which there is not authentication information for the first service stored in the specific storage area, of the two or more intended uses.

10. The non-transitory computer-readable medium according to claim 8, wherein the instructions are configured to, when executed by the processor, cause the processor to:
acquire device information regarding the one or more devices usable in the first service, the device information corresponding to the authentication information transmitted to the first external device;
determine whether a device usable in the first service is associated with the authentication information transmitted to the first external device, based on the acquired device information;
when determining that a device usable in the first service is not associated with the authentication information transmitted to the first external device, accept a selection between using authentication information different from the authentication information transmitted to the first external device and not using authentication information different from the authentication information transmitted to the first external device;
when accepting a selection of using authentication information different from the authentication information transmitted to the first external device, control the communication unit to transmit the different authentication information to the first external device; and
when accepting a selection of not using authentication information different from the authentication information transmitted to the first external device, store the authentication information transmitted to the first external device into the specific storage area in association with the selected one of the two or more intended uses.

11. The non-transitory computer-readable medium according to claim 8,
wherein the instructions are configured to, when executed by the processor, cause the processor to:
accept a selection of a device from among the one or more devices usable in the first service; and
store, into the specific storage area, the authentication information transmitted to the first external device and device information regarding the device selected from among the one or more devices usable in the first service, in association with the selected one of the two or more intended uses.

12. The non-transitory computer-readable medium according to claim 11,
wherein the instructions are configured to, when executed by the processor, cause the processor to:
acquire device information regarding the one or more devices usable in the first service, the device information corresponding to the authentication information transmitted to the first external device; and
when there are two or more devices identified by the acquired device information, store the authentication information transmitted to the first external device into the specific storage area in association with each of one or more intended uses other than the selected intended use, of the two or more intended uses, without associating the device selected from among the one or more devices usable in the first service with the one or more intended uses other than the selected one of the two or more'intended uses.

13. The non-transitory computer-readable medium according to claim 12,
wherein the instructions are configured to, when executed by the processor, cause the processor to store the authentication information transmitted to the first external device into the specific storage area in association with each of the one or more intended uses other than the selected intended use, of the two or more intended uses, provided that authentication information for the first service is not stored in the specific storage area in association with the one or more intended uses other than the selected intended use.

14. The non-transitory computer-readable medium according to claim 11,
wherein the instructions are configured to, when executed by the processor, cause the processor to:
acquire device information regarding the one or more devices usable in the first service, the device information corresponding to the authentication information transmitted to the first external device; and
when there is a single device identified by the acquired device information, store, into the specific storage area, the authentication information transmitted to the first external device and the device information regarding the device selected from among the one or more devices usable in the first service, in association with each of the one or more intended uses other than the selected intended use, of the two or more intended uses.

15. The non-transitory computer-readable medium according to claim 14,
wherein the specific storage area is configured to, when there are two or more intended uses of the one or more devices usable in the first service, store, authentication information for the first service and device information regarding a device usable in the first service, in association with each individual one of the two or more intended uses, and
wherein the instructions are configured to, when executed by the processor, cause the processor to store, into the specific storage area, the authentication information transmitted to the first external device and the device information regarding the device selected from among the one or more devices usable in the first service, in association with each of the one or more intended uses other than the selected intended use, of the two or more intended uses, provided that authentication information for the first service is not stored in the specific storage area in association with the one or more intended uses other than the selected intended use.

16. The non-transitory computer-readable medium according to claim 3,
wherein the storage comprises:
a first storage area configured to store authentication information for the first service; and
a second storage area configured to store authentication information for the second service, and
wherein the instructions are configured to, when executed by the processor, cause the processor to:
control the communication unit to transmit authentication information input on the authentication screen displayed in response to acceptance of an instruction concerning display of the authentication screen, to a specific external device configured to perform authentication for at least one of the first service and the second service; and
when the authentication information transmitted to the specific external device is certified on the specific external device, store the certified authentication information into the first storage area as authentication information for the first service, and store the certified authentication information into the second storage area as authentication information for the second service.

* * * * *